July 15, 1941.  C. C. BENNETT  2,248,938
POWER TESTER
Original Filed June 9, 1936   6 Sheets-Sheet 1

INVENTOR.
CLAUDE C. BENNETT
BY
ATTORNEY

July 15, 1941.   C. C. BENNETT   2,248,938
POWER TESTER
Original Filed June 9, 1936   6 Sheets-Sheet 2

INVENTOR.
CLAUDE C. BENNETT
BY H. O. Clayton
ATTORNEY

Fig. 3

July 15, 1941.  C. C. BENNETT  2,248,938
POWER TESTER
Original Filed June 9, 1936   6 Sheets-Sheet 6

INVENTOR.
CLAUDE C. BENNETT
BY H. Q. Clayton
ATTORNEY

Patented July 15, 1941

2,248,938

UNITED STATES PATENT OFFICE 2,248,938

POWER TESTER

Claude C. Bennett, South Bend, Ind., assignor to A. E. Feragen, Inc., Seattle, Wash., a corporation of Washington Original application June 9, 1936, Serial No. 84,273. Divided and this application May 15, 1937, Serial No. 142,888

3 Claims. (Cl. 265—24)

My invention relates to machines for testing automobiles more particularly for testing the power delivered at the automobile's driving wheels under various conditions of speed and load, thus indirectly testing the power of the automobile's engine, and by means of which, concurrently with the progress of the test, the engine may be suitably adjusted.

It is an object of this invention to provide a device whereby the engine may be tested in the car and under conditions simulating road conditions, and by a machine whereby a workman may conveniently control the conditions of the test at the same time and from the same position where he stands to work upon the engine, so that he may conveniently accomplish adjustments and test the effect of such adjustments at various speeds, and under various operating conditions of speed and load, accomplishing both the adjustments of the engine and the control of the conditions of the test, and observing the indications of the tests and of the condition of the engine without leaving his position at the engine.

It is a further object to provide such a machine which is readily adjustable for cars of various sizes, more particularly cars which vary in length.

It is a further object to provide a machine of this character in which the owner of the car or a workman occupying the driver's seat may control the engine in the normal manner and with the usual controls, as it would be controlled while traveling on the road, and at the same time can vary the conditions of the test to simulate varying service conditions.

It is a further object to provide in a machine of this character a power absorption device which will function properly under tests of appreciable duration, and at varying speeds, and such power absorption device as disclosed takes the form of an hydraulic absorption device, and to the requirements of such tests as those indicated above.

It is an object to provide an automatic compensator, of particular value in extended tests, whereby the resistance of the dynamometer may be kept substantially constant, without appreciable attention on the part of an operator. More particularly, it is an object to maintain the volume of water within or passing through the dynamometer automatically at a given value, which may be varied at will, decreasing the amount of water within the dynamometer as the torque tends to increase, or increasing the amount therein as the torque tends to decrease, thereby maintaining the resistance of the dynamometer constant, and imposing a constant load on the engine being tested.

Another object is to provide means to test the actual pull of an automobile, in the nature of a draw-bar test, for a quick check of the engine's power, and to employ for such test means which will not interfere with the other tests to be conducted.

It is an object to provide a machine for accomplishing such tests which may be set up within a garage or like establishment, which will take up a minimum of floor space, and which will be thoroughly rugged and reliable in operation over extended periods.

Other objects, and more particularly such as pertain to details of the operation of the machine, or the mechanical structure thereof, will be better understood as this specification progresses.

My invention comprises the novel machine as a whole, and the several novel parts thereof, and their relative combination, all as shown in the accompanying drawings, and as will be hereafter described in this specification and more particularly pointed out and claimed in the claims which will be found at the end of the same.

In the accompanying drawings I have shown my invention in illustrative forms, as now preferred by me.

In testing an automobile it is convenient to run it upon spaced runways 9, elevated somewhat above the floor by means of supports 90. In this way the various testing devices, controls, etc. may be formed as an integral part of the machine and kept in general below the level of the automobile chassis, and running gear, and within the general confines of the automobile, for economy of floor space, and the entire machine may be installed as a unit without special preparation, such as the digging of a pit. However, it will be understood that the machine might well be installed in a pit or otherwise upon the floor of the garage, and to this extent the employment of an elevated framework and runways is a matter of convenience, and the modifications in design for a pit installation would be obvious to a man skilled in this art. Access may be had to the runway by means of ramps, indicated at 91.

Adjacent the end of the runway which is to support the driving wheels of the car, usually the rear wheels, are supported a pair of rollers I and I', one in each runway, and spaced from these rollers to form with them a cradle for the wheel W of the car are rollers 10 and 10'. Both rollers I and I' are secured upon a transverse shaft 11 so that both rollers turn at the same rate of speed. Preferably the rollers 10 and 10' are merely idlers, and serve to permit the wheel W to roll freely, and in doing so to rotate the rollers I and I'. These rollers are of sufficient width to accommodate an automobile tread of any usual width. The entire arrangement may be supported in a frame 92 which is rigidly secured to and in effect forms a part of the main frame.

Mounted upon the shaft 11 is an hydraulic absorption dynamometer, generally indicated by the numeral 2. The internal construction of such a dynamometer (for example, of the Froude type) is well known, and the particular type employed may be any which is found suitable. In effect a rotor (not shown) is secured upon the shaft 11 to be rotated thereby, and a casing 20 is oscillatably mounted upon the shaft 11 surrounding the rotor by bearing members 21. Fluid, usually water, is supplied to the interior of the dynamometer by a conduit 22, and after passing through the dynamometer is discharged by means of a conduit 23. The amount of air within the dynamometer, which is one means of controlling the amount of water therein, may be controlled by means of an air vent line 24, connected to the axial part of the dynamometer. Thus the water within the dynamometer transmits the power from the shaft and rotor to the stator or casing 20, and in so doing absorbs the power delivered to the shaft 11, and produces a torque which is impressed upon a torque arm 25 secured to the casing 20. Arrangements are made to control the water supply to and the discharge from the dynamometer, and for controlling the venting of the air. These will be described later, but it is desired to point out here that the water discharge valve should be located close to the dynamometer itself, and to that end I provide a control valve 26 adjacent the dynamometer casing. Because the dynamometer casing must be free to oscillate with the minimum of external resistance, in response to the torque transmitted to it through the liquid within, flexible connections must be employed in the various lines leading to the dynamometer, as is customary in such devices.

It will be observed that the dynamometer is disposed between the rollers I and I', and beneath the rear end of the automobile. The dynamometer may be made sufficiently small that it does not project materially above the level of the runways 9, so that all parts of the running gear of the car may readily clear it in running upon the runways. An hydraulic absorption dynamometer will absorb large quantities of power over extended periods, and will still continue to function properly and accurately. Thus located it requires no space in addition to that occupied by the automobile.

Being located beneath the rear end of the car, and the workman working upon the engine being adjacent the front end of the car, it is difficult for him directly to coordinate adjustments with the indications of torque, or to read a revolution counter which must be associated with the shaft 11. Moreover, it would be extremely difficult for him to vary the water supply to or the discharge from the dynamometer, or the venting of the same, while working upon the engine. To the end that the workman may effect adjustments in the dynamometer, observe the indications resulting from its operation and so control the conditions of the test, provision is made to group all such controls and indications at one point, conveniently to the workman who is working upon the automobile's engine. This is complicated, however, by the fact that the workman is not always in the same position. Some cars have a short wheel base; others are considerably longer. I have provided a platform 93 whereon the workman may stand, which is supported along one side of the main frame, and which is guided thereon as, for example, by the medium of hangers 94, so that it may be adjusted lengthwise of the runway 9, to place it adjacent the engine of any car in position upon the runways and upon the rollers I and I'. Carried by this platform is a panel 8 (see Figure 3) whereon are grouped various controls and indicating instruments. The problem of grouping the various controls and instruments is complicated by the fact that this platform must be adjustable lengthwise of the runway.

In its simplest form (see Figure 9) when automatic control of the uniformity of the resistance is not required, I provide for the torque indicator a plunger 261, whereon the end of the torque arm 25 bears, the plunger working within a cylinder 27 mounted upon the frame, and communicating with a pressure gauge 82, suitably calibrated, on the panel 8 through a pressure line or conduit 28. A revolution counter within the casing 3 drives a shaft 30 parallel to the runway 9 at a rate which is a function of the speed of the shaft 11, and adjacent the platform 93 this shaft 30 is divided, through gearing within the casing 31, to drive two flexible shafts 32 and 33, connected respectively to a tachometer 34 and a speedometer 35 on the panel 8. Thus through the torque indicator 82 and the tachometer 34 the power delivered may be calculated, reference being had to a conversion table, if necessary, for wheels of different diameter, and by the speedometer 35 the workman may observe the speed at which the car would be operating were it upon the road. The tachometer may, of course, be calibrated in terms of revolutions of the engine instead of revolutions of the wheel W, if that be preferred, although this is not recommended in a machine for general use, as the gear ratios of different cars vary.

The water supply conduit 22 is preferably led also through a flexible hose 40 and a valve 4, the purpose of which will be explained hereafter, to a control valve 41 on the panel 8, so that water is supplied from a pipe 42 leading to the water main or other suitable source, preferably under pressure, past the valve 41 on the panel, thence past the valve 4 and thence into the interior of the dynamometer 2, through the pipe 22. The water pressure is indicated by a gauge 83, connected by a suitable conduit to the water supply line. The water discharge line 23 leads to a drain or to any suitable receiver, but since the discharge control valve 26 is located closely adjacent the dynamometer I provide means to control this valve from the platform 93. Thus the stem of the valve 26 is extended, as indicated at 45, and is connected through bevel gears or like devices at 46 to a shaft 47 extending lengthwise of one of the runways 9 to a point adjacent the platform 93 where it is connected through a flexible shaft 49 or like means to control handle 49 on the panel 8. By these or any equivalent means the discharge of water from the dynamometer may be controlled without leaving the platform. Similarly the air vent pipe 24 leads lengthwise of the runways 9, and communicates through a flexible hose 43 to a control valve 44 upon the panel 8.

It is sometimes desirable as a quick check on the power of an automobile to determine what force is developed, as in pulling. Such a test will indicate to a prospective customer whether or not his engine is developing the power it should. An automobile, being driven by an internal combustion engine, cannot be coupled while stationary to a drawbar and then achieve any pull, but the automobile can be run on this machine at any desired speed, without appreciable resistance, and then resistance can be thrown in, by admitting water to the dynamometer, tending to stop the rollers 1 and 1', so that in effect the automobile tends to roll forward, and the amount of pull developed in so doing may be measured.

Figures 1, 10:
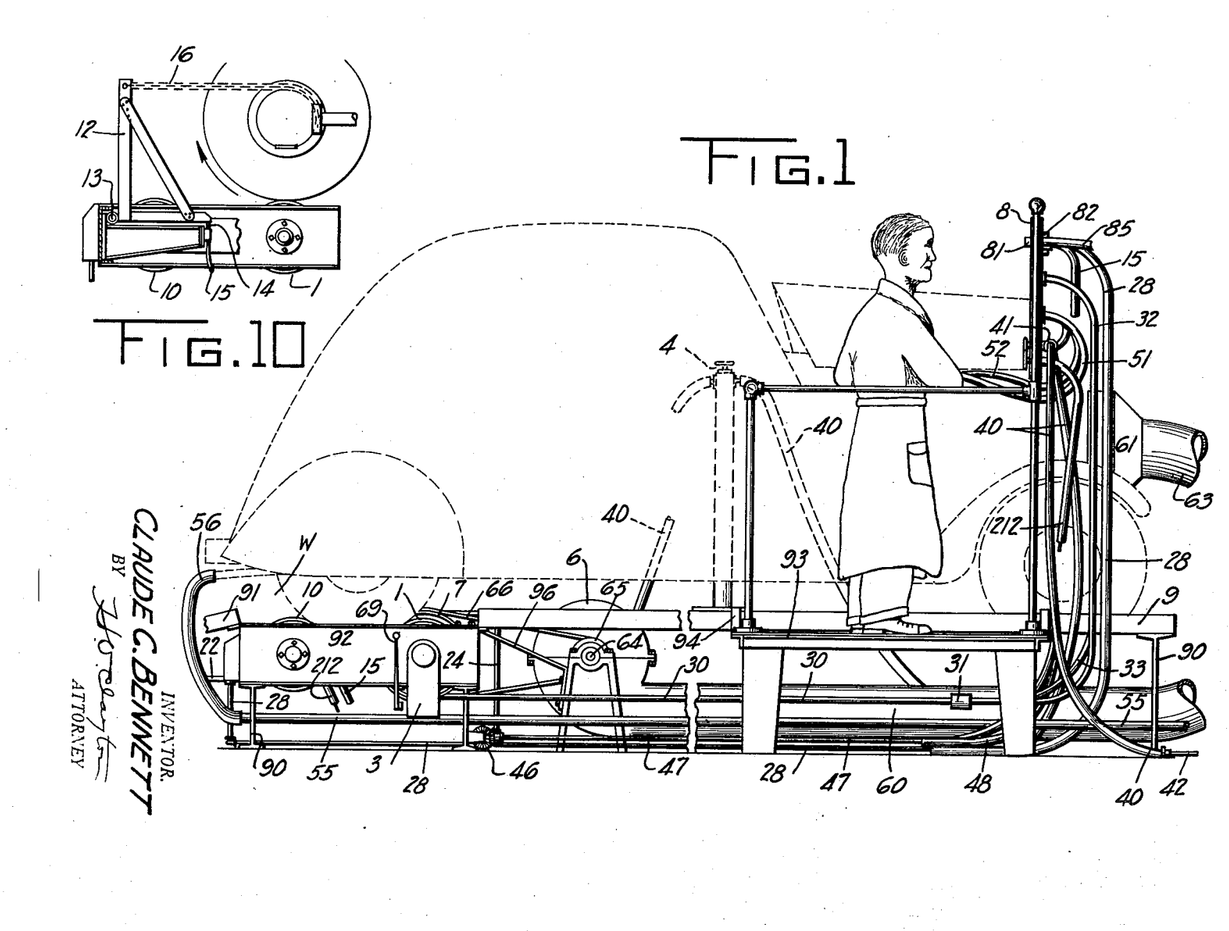
Figure 1 is a side elevation of the complete machine, showing an automobile placed thereon in operative position.
Figure 10 is an elevation of the drawbar pull tester, in operative relationship to the rear axle of an automobile.
Figure 2:
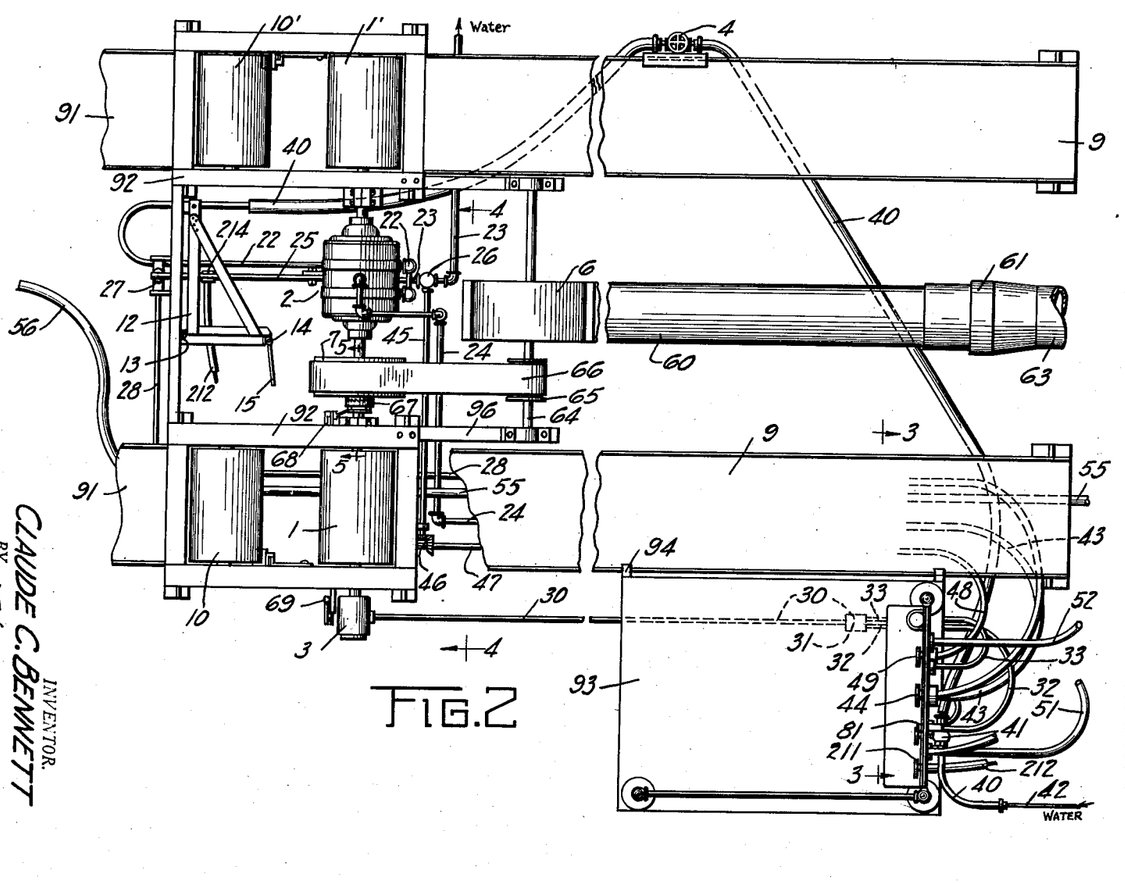
Figure 2 is a plan view of the machine, with certain parts broken away.
Figure 3:
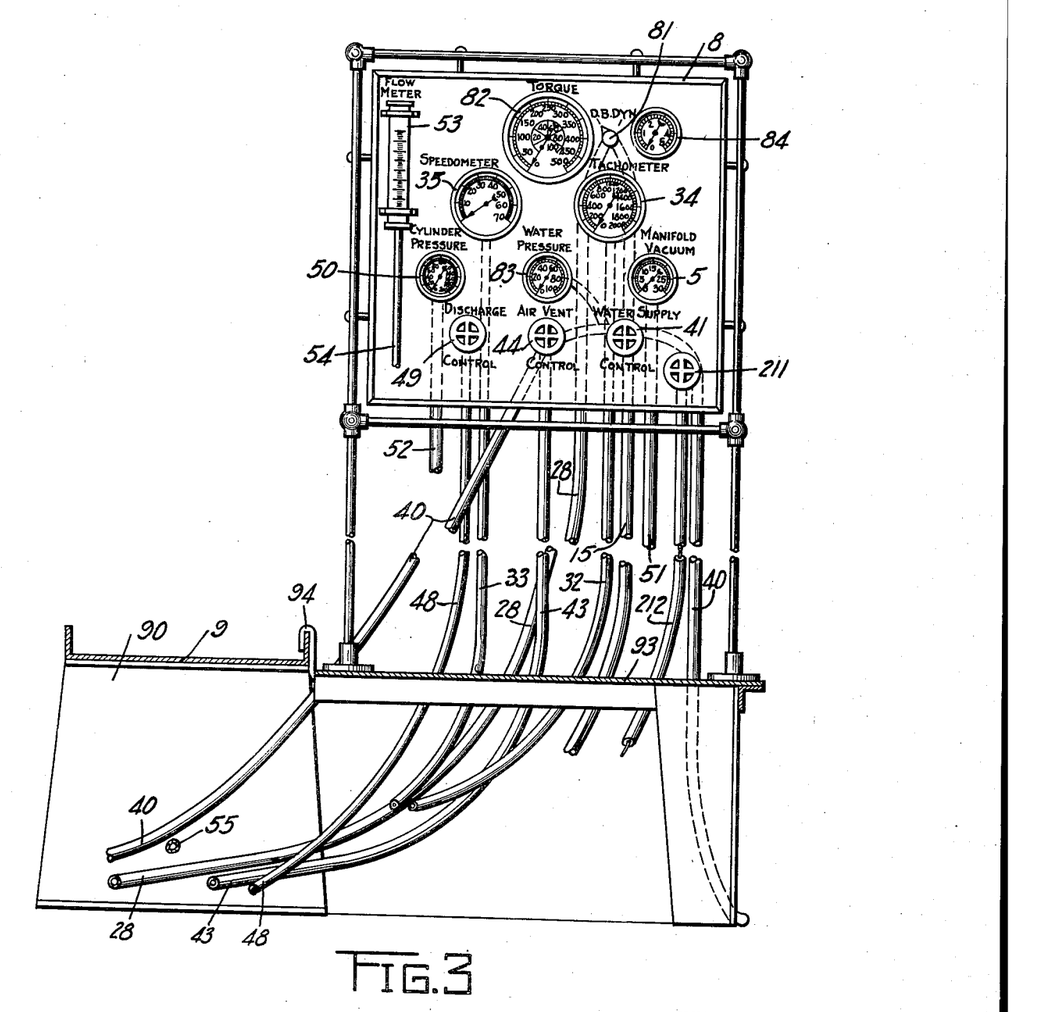
Figure 3 is a transverse section on the line 3—3 of Figure 2, illustrating the control and indicator panel.

To this end I provide the mechanism best shown in Figure 10. A brace frame 12 is tiltable about a transverse pivot 13, and likewise is swingable about a longitudinal axis, so that it may swing from the position shown in Figure 10, which is the operative position, to a stored position, as shown in Figure 2, where it is out of the way. When in the operative position its end opposite the pivot 13 bears upon a plunger 14, similar to the plunger 261 and connected by a pressure line 15 to a gauge upon the panel 8. Since the gauge 82 also measures pressure, this gauge may be provided with a second set of calibrations, and valve 81 may be movable into two alternative positions, either to connect the pressure line 15 with the gauge, or to connect the pressure line 28 therewith. In the first position, as shown in Figure 3, it will measure the drawbar pull, the upper end of the frame 12 being connected by a chain 16 or like means to the axle of the car, and in the second position it will register the torque developed at the wheel W as a function of the pressure developed by the plunger 261. When the frame 12 is not in use it may be swung down into the position of Figure 2, where it is out of the way, yet available whenever required.

By the various means described the workman on the platform may observe the conditions and the results of the tests while he is working upon the engine, and can control and vary those conditions. The load may be varied by operation of the dynamometer controls, and the speed by operation of the normal engine controls. He is also interested in the condition of the engine, as for example the pressure within any given cylinder and the vacuum produced in the intake manifold. To indicate such conditions I provide upon the panel 8 a manifold vacuum gauge 5 and a cylinder pressure gauge 50. The manifold vacuum gauge has connected to it a hose or flexible conduit 51 which may be connected to any convenient point in the intake manifold of the automobile's engine, and the cylinder pressure gauge 50 likewise has a flexible connection 52 which can be connected through the spark plug hole into any of the cylinders of the engine. He is interested in the pressure of the fuel pump which must be kept rather closely within low limits, and in the back pressure in the exhaust line, and a sensitive low pressure gauge 84 is provided with a tube 85 for connection to either such points, or for similar purposes.

In order to determine the gasoline consumption of the engine in a given length of time I may mount upon the panel 8 a flow meter consisting of a graduated container 53 which may be connected through a flexible conduit 54 with the fuel feed system of the engine, the regular supply connection thereto being disconnected for the purpose of the test, and the workman may observe the gasoline consumption of the car at any speed or under any conditions of load, since these may be varied either by varying the dynamometer controls or by governing the engine with its normal controls while he is working upon it, or both.

The exhaust gases of the motor while under test are preferably led to the outside air by means of conduit 55 having a flexible connection 56 which may be connected directly to the end of the engine's exhaust pipe, as is indicated in Figure 1. This avoids contamination of the air, or danger from carbon monoxide, in a closed garage.

Figure 7:
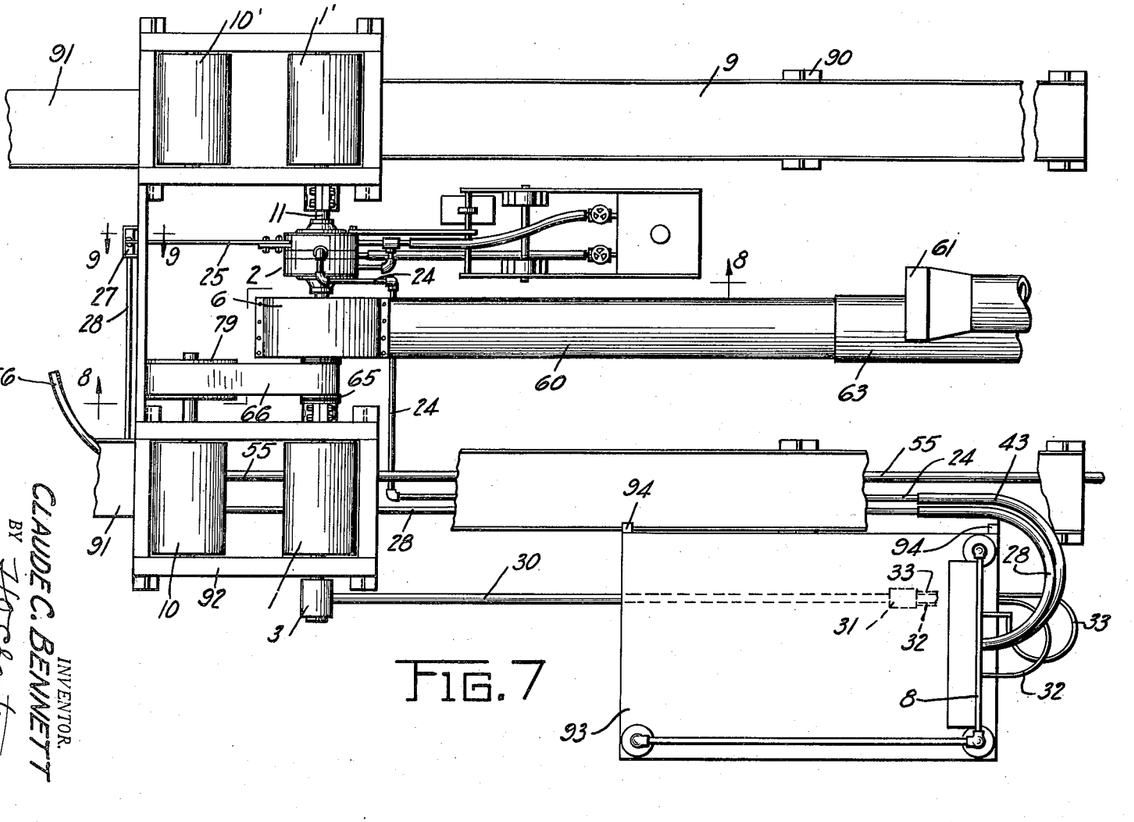
Figure 7 is a plan view corresponding to Figure 2, showing a modified form of the invention.

An engine, while undergoing such a test, may heat up considerably, since it is not subject to the cooling effect of movement through the air, and its fan is not so designed as to keep it cool for long periods while standing still. To cool the engine, and thereby to obtain conditions more nearly approximating road conditions, I prefer to employ a blower 6, which may be driven from the shaft 11, or independently, and which discharges through a conduit 60, the end 61 of which is curved back and directed into the radiator or over the engine of the automobile. Preferably the outer section 63 of the discharge conduit 60 is telescopically mounted upon the inner section, as is best seen in Figure 7, so that it is adjustable for cars of different lengths, to the end that the discharge end 61 may be placed closely adjacent the front of the radiator, as is seen in Figure 1, whatever may be the length of the car.

Since in some installations, or for tests of short duration, it is unnecessary or it may not be desired to employ the blower or equivalent engine cooling means, I prefer that it be supported upon separate frame members 96, secured to the frame members 92 and projecting forwardly thereof, so that it may be omitted if the user prefers. In the frame members 96 is journaled a shaft 64 carrying the blower blades (not shown), and a pulley 65, by means of which the blower is rotated. In this form shown in Figures 1 and 2, the pulley 65 is driven by a belt 66 from a pulley 7 upon the shaft 11.

The blower must operate at a comparatively high speed to attain reasonable efficiency, and therefore the pulley 7 is made larger than the pulley 65. However, if the speed of the shaft 64 was always in direct ratio to the speed of the shaft 11, as the speed of the shaft 11 increases the blower would eventually be operating at speeds considerably in excess of any efficient speed. For that reason I prefer to provide automatically operable means whereby with increase of speed of the shaft 11 the relative speed of the blower is reduced, thus operating the blower at all times between efficient limits of speed.

Figures 5, 6, 11:
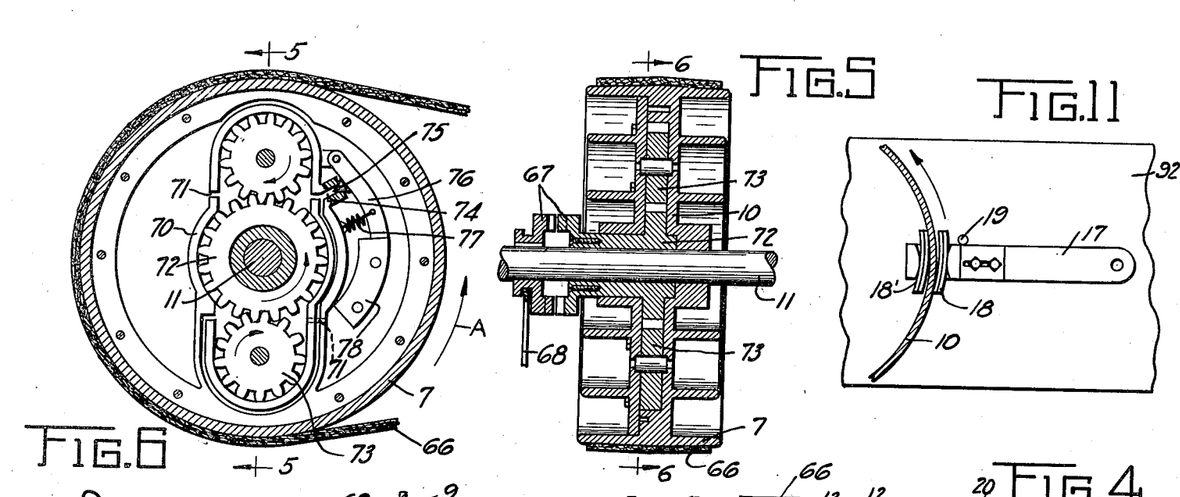
Figure 5 is a section through a driving pulley, associated with the dynamometer shaft, taken on the line 5—5 of Figures 2 and 6.
Figure 6 is a section through the same on the line 6—6 of Figure 5.
Figure 11 is a detail sectional view showing an automatic lock for the car-supporting rollers, to assist in backing the automobile off the device at the conclusion of a test.

The arrangement for accomplishing this is shown in Figures 5 and 6. The pulley 7 is formed as a reservoir to contain a liquid such as oil. Within it is mounted a gear pump casing 70 forming an integral part of the pulley, and having inlets 71 to the pump chamber within. The primary gear 72 of the pump is indirectly secured to the shaft 11 by means of a clutch 67 and rotates therewith. Idler gears 73 are journaled within the gear casing 70, and when they are rotated by the primary gear 72 they serve to draw oil inward through the ports 71 and to discharge this fluid from within the gear pump housing 70 through the single port 74, which is controlled by a valve 75. With the pulley rotating in the direction of the arrow A (Figure 6), at slow speed, the valve 75, mounted on the arm 76, is held closed by a spring 77. As a result the oil cannot be discharged from within the gear pump housing 70; the gears 72 and 73 are locked together, and the pulley 7 turns at the same speed as the shaft 11. As the speed of rotation of the pulley 7 increases, however, a weight 78 upon the arm 76 is thrown outwardly by centrifugal force in opposition to the spring 77, to a greater or less extent, depending upon the speed of rotation, and in consequence the valve 75 is opened more or less, permitting discharge of oil from within the housing 70 and permitting the idlers 73 to rotate planet-like about the primary gear 72. In this manner the speed of the pulley 7 relative to the speed of the dynamometer 2 is decreased at higher speeds of the latter, and consequently the blower 6 is driven at a slower relative speed for higher speeds of the engine, and is thereby maintained within efficient speed limits, whatever may be the speed of the engine.

Figure 4:
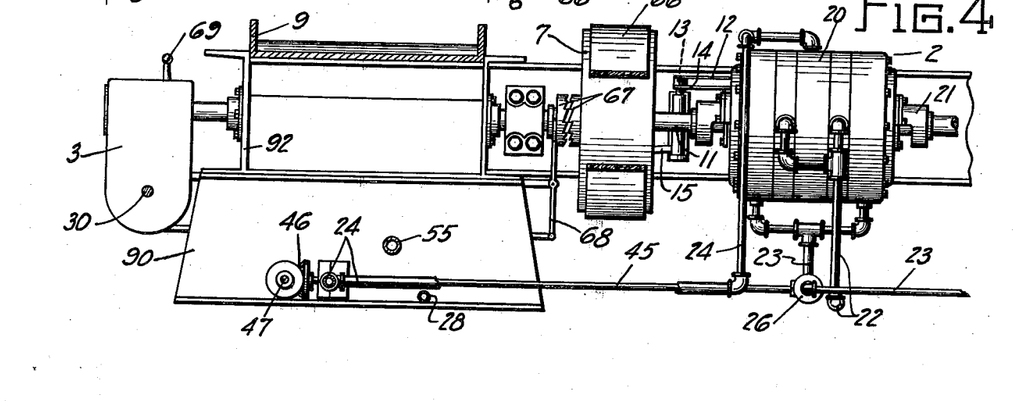
Figure 4 is a transverse section on the line 4—4 of Figure 2, illustrating the dynamometer and associated parts.

As will now be evident, an automobile is run upon the runways 9 until the driving wheels are cradled between the cooperating rollers 1 and 10, 1' and 10'. With all connections made as are required by the particular test to be performed (for example the exhaust conduit 56 and the conduits 51 and 54), the automobile's engine is driven under conditions simulating road or service conditions. The resistance or load may be varied by varying the rate of discharge of water from the dynamometer through the valve 26, or by controlling the rate of admission of water by the valve 41, or the discharge of air by the control 44. In this way loads may be imposed on the automobile engine corresponding to hill climbing and the like, and the engine may be tested at various speeds under various conditions by the workman upon the platform 93, who is at the same time adjusting and manipulating the engine. The workman may occupy the driver's seat of the automobile and control its engine by the usual controls in the car, or the owner of the car may do so, and while controlling the engine in this way, the conditions under which it is operating may be varied and controlled by means of the valve 4, this being placed conveniently to be operated by the occupant of the driver's seat of the car, and serving to control the water supply to the dynamometer. Such a control might, as is recognized by those familiar with dynamometers, be connected to the discharge line of the dynamometer. During all this time the engine is being cooled in the normal manner by the blower 6 without the expenditure of an undue amount of power, and at an efficient speed of the blower. If desired, the power absorbed by the blower 6 may be suitably calculated or measured and indicated upon the panel 8. The blower or its drive pulley 7 may be disconnected when extreme accuracy is desirable. To this end I provide complemental clutch members 67, previously referred to, one keyed to the shaft 11 and one secured to the gear 72 (see Figure 5), engageable and disengageable by a yoke 68 controlled by a suitable handle 69 (Figures 1, 2 and 4).

Figures 8, 9:
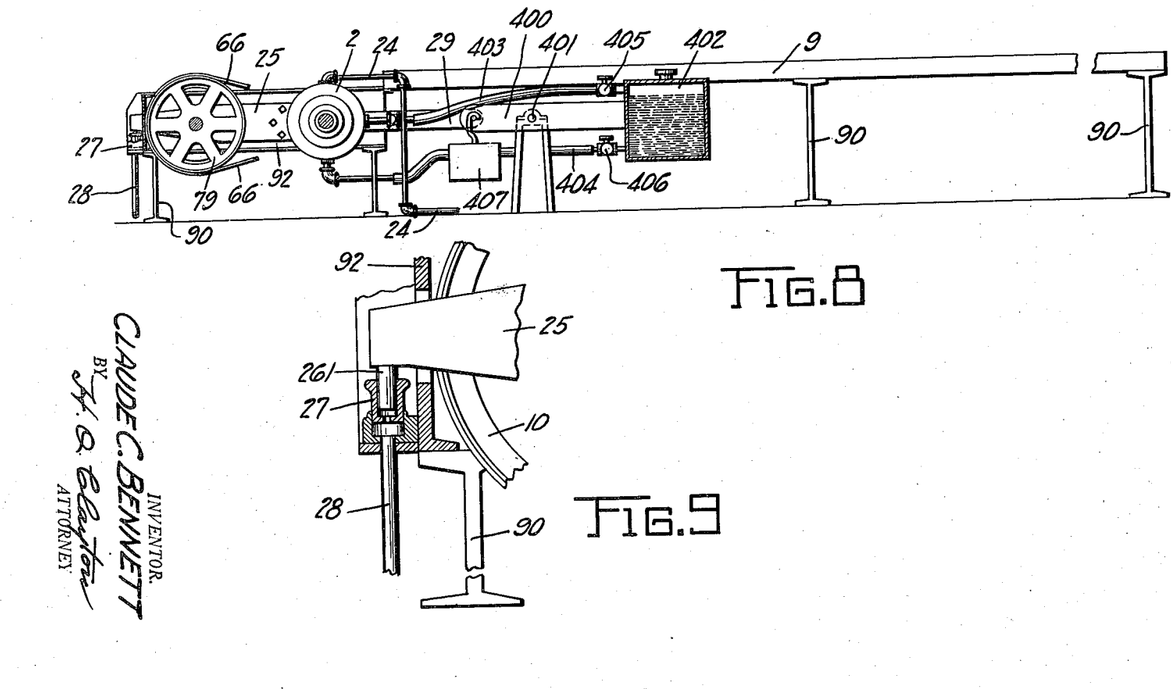
Figure 8 is a section on the line 8—8 of Figure 7.
Figure 9 is a sectional view illustrating the pressure responsive means of the torque indicator.

In Figures 7 and 8 the blower has been shown as loosely mounted upon the shaft 11, driven by a pulley 79, which may, if desired, be formed similarly to the pulley 7 previously described, being in this instance mounted upon the shaft of an idler roller 10.

In this form I have shown an automatic control for the dynamometer, for use particularly when the car is to be tested over a considerable period of time, and its speed should be kept constant during such a test. This may be employed, for example, in running in a new car, or a car which has been overhauled, or in an extended fuel consumption test.

In this form the dynamometer casing is provided with an additional torque arm 29, which with increase of torque within the dynamometer tends to rise. It is connected to an arm 400 pivoted at 401 and carrying at its opposite end a reservoir 402 filled with water. Flexible conduits 403 and 404 afford a circulating connection between the dynamometer and the reservoir 402, and are controlled by suitable valves 405 and 406. A counterweight 407 may be employed to counteract the tendency of the water-filled reservoir 402 to oscillate the dynamometer.

Now as torque within the dynamometer increases, it tends to raise the torque arm 29, thereby tending to lower the reservoir 402. Since the reservoir 402 is substantially level with the dynamometer casing 2, lowering the reservoir tends to lower the level of water within the dynamometer. It is well known that as the water level within an hydraulic absorption dynamometer is lowered the power absorption thereof decreases, and consequently the tendency to raise the torque arm 29 is lessened, and this is brought back to its initial position by the counterweight 407, thus again raising the water level in the reservoir with respect to the water level within the dynamometer, and again increasing the torque in the dynamometer. Actually there is no appreciable oscillation or tendency to rise and fall, but equilibrium is soon reached, and the dynamometer continues to rotate under substantially the same load, although if the load varies because of variation in the operating conditions of the engine, this arrangement will automatically compensate for such changed conditions, and will maintain the engine running at a substantially constant speed and load. While not shown herein, suitable arrangements may be made for cooling the water as it circulates in this system, and similarly with respect to the pulley 7 arrangements may be made for cooling the fluid circulating therein, but as such arrangements are common and form no essential part of this invention they have not been shown.

In order that a car may be backed off the machine, whenever desired, without an attendant locking the rollers 10 and 10' (and unless these are locked to resist reverse movement of the wheels W the car cannot be backed off by its own power), I may provide a lock which is disengaged by forward driving rotation of wheel W and rollers 10 and 10', but which automatically locks to prevent reverse rotation. Any suitable means to this end may be employed, that shown in Figure 11 being typical. An arm 17, pivoted upon the frame at one end, has two shoes 18 and 18', at least one of which is adjustable for wear, engaging outside and inside the rim of a roller 10 or 10', as the case may be. A stop pin 19 limits swinging of the arm 17 upward, because of frictional engagement of the shoes with the roller when driven in a forward direction, to a position wherein there is no appreciable binding effect on the roller. If the wheel W tends to drive the roller 10 reversely, the shoes bind on the roller and lock it effectively against movement, so that, the roller being stationary, the wheel W may readily back the car off.

The invention theretofore described is disclosed in my copending application Serial No. 84,273, filed June 9, 1936, this application constituting a division thereof.

I desire to point out that while an hydraulic absorption dynamometer has been found most suitable for the purposes of this machine, it is not outside the scope of my invention to substitute therefor other equivalent power absorption devices as are common in the art, and while certain thereof, as for example a Prony brake, will not operate satisfactorily for long continued tests, it may be found entirely satisfactory for short test. Various other changes may be made in the character, arrangement, and control of the device, without departing from the spirit and scope of my invention, and I do not desire to be restricted as to such matters other than as is required by the appended claims.

I claim:

1. A machine for testing automobiles comprising a pair of runways spaced apart to receive the wheels of an automobile, a pair of connected rollers, one in each runway, to receive the driving wheels of the automobile, a power absorption device operatively connected to the rollers and disposed therebetween, a blower disposed between the runways and driven from the rollers, means automatically operable, with increase of speed of the rollers, to reduce the relative speed of the blower and rollers, a discharge conduit leading from the blower, its discharge end being directed rearwardly toward the radiator of an automobile received on the runways, and means to adjust the position of such discharge end to place it immediately in front of automobiles of varying lengths.

2. In a machine for testing automobiles comprising a dynamometer and means to deliver power thereto from an engine at a speed related in direct ratio to the speed of such engine, a blower having a discharge outlet directed to cool such engine, means to drive said blower from such engine including a driving shaft and a pulley thereon internally chambered to form a liquid reservoir, a gear pump and casing therefor enclosed therein and having inlet ports freely open to the reservoir, and a discharge port opening into the reservoir, the primary gear of said pump being secured on said shaft, valve means to close said discharge port, yieldable means normally holding said valve means closed, and means responsive to centrifugal force and carried by the pulley to open said valve means in response to increased speed of the pulley thereby to lessen automatically the driving connection between the shaft and pulley and to decrease the ratio of the speed of the blower to the speed of the dynamometer.

3. A machine for testing automobile engines comprising a shaft adapted to be driven from such engine, an hydraulic absorption dynamometer casing oscillatable upon said shaft, a dynamometer rotor within the casing and secured to the shaft, a reservoir connected to the casing for circulation of liquid therethrough, means supporting the reservoir for vertical movement from a normal position substantially level with the dynamometer casing, and means operable in response to oscillation of said casing under increased torque to lower the reservoir, and thereby the level of liquid in the casing to lessen the torque automatically, and vice versa.

CLAUDE C. BENNETT.